(12) United States Patent
Sintorn et al.

(10) Patent No.: US 10,370,058 B2
(45) Date of Patent: Aug. 6, 2019

(54) REMOVABLE INSERT SYSTEM (71) Applicant: ÖHLINS RACING AB, Upplands Väsby (SE)

(72) Inventors: Torkel Sintorn, Vaxholm (SE); Erik Ladufjäll, Upplands Väsby (SE)

(73) Assignee: OHLINS RACING AB, Upplands Väsby (SE)

( * ) Notice: Subject to any disclaimer, the term of this patent is extended or adjusted under 35 U.S.C. 154(b) by 53 days.

(21) Appl. No.: 15/525,555

(22) PCT Filed: Nov. 10, 2015

(86) PCT No.: PCT/EP2015/076241
§ 371 (c)(1),
(2) Date: May 9, 2017

(87) PCT Pub. No.: WO2016/075156
PCT Pub. Date: May 19, 2016

(65) Prior Publication Data
US 2017/0334503 A1 Nov. 23, 2017

(30) Foreign Application Priority Data

Nov. 10, 2014 (SE) ...................................... 1451346

(51) Int. Cl.
*B62K 25/08* (2006.01)
*F16F 9/32* (2006.01)
(Continued)

(52) U.S. Cl.
CPC .............. *B62K 25/08* (2013.01); *F16F 9/062* (2013.01); *F16F 9/18* (2013.01); *F16F 9/3257* (2013.01);
(Continued)

(58) Field of Classification Search
CPC ... B62K 25/08; F16F 9/062; F16F 9/18; F16F 9/3257; F16F 9/3271; F16F 9/44; B60G 2300/12
See application file for complete search history.

(56) References Cited

U.S. PATENT DOCUMENTS 6,513,822 B1  2/2003  Chonan
2007/0096376 A1*  5/2007  Murakami ............. B62K 25/08
                                                                    267/195
(Continued)

FOREIGN PATENT DOCUMENTS

EP  1544094 A1  6/2005
EP  1770004 A2  4/2007
WO  96/015021 A2  5/1996

OTHER PUBLICATIONS

International Search Report and Written Opinion for International Application No. PCT/EP2015/076241, dated Mar. 14, 2016 (12 pages).
Office Action for European Patent Application No. 15791322.9, dated May 17, 2018, 6 pages.

*Primary Examiner* — Kevin Hurley
*Assistant Examiner* — Marlon A Arce
(74) *Attorney, Agent, or Firm* — Kagan Binder, PLLC (57) ABSTRACT

The present invention relates to a removable insert system (R) for a telescopic fork leg (1) of a bicycle, said telescopic fork leg (1) comprising outer and inner legs (1b, a), wherein said removable insert system comprises a piston and piston rod arrangement (6, 8) comprising a piston rod (8) arranged at least partly within a first tube (7), said removable insert system (R)being removably arranged within at least one of said inner legs (1a) such that, when being mounted in said inner leg, the removable insert system is adapted to form a damping system (D) with said inner leg, and wherein said inner leg and said first tube are both acted upon by a flow of medium created by compression and expansion movements (Continued)

of the fork legs, said damping system further comprising medium flow passages (C1, C2) that are parallel in relation to each other, and that run between the upper and lower sides of said piston (6)The invention also relates to a damping cartridge kit (DC) for upgrading a telescopic fork leg of a bicycle, said cartridge kit comprising a removable insert system (R).

19 Claims, 5 Drawing Sheets

(51) Int. Cl.
  *F16F 9/06* (2006.01)
  *F16F 9/44* (2006.01)
  *F16F 9/18* (2006.01)
(52) U.S. Cl.
  CPC .............. *F16F 9/3271* (2013.01); *F16F 9/44* (2013.01); *B60G 2300/12* (2013.01); *F16F 2230/32* (2013.01)

(56) References Cited

U.S. PATENT DOCUMENTS

| 2009/0001684 | A1  | 1/2009 | McAndrews et al. |
| 2012/0187652 | A1* | 7/2012 | Wimmer |
| 2017/0080767 | A1* | 3/2017 | Yamashita ................ F16F 9/34 |
| 2017/0261061 | A1* | 9/2017 | Chikamatsu ............. F16F 9/36 |

* cited by examiner

REMOVABLE INSERT SYSTEM

CROSS-REFERENCE TO RELATED APPLICATIONS

This application claims priority to International Application No. PCT/EP2015/076241, filed Nov. 10, 2015, and titled "REMOVABLE INSERT SYSTEM"which in turns claims priority from Swedish Application having serial number 1451346-9, filed on Nov. 10, 2014, both of which are incorporated herein by reference in their entireties.

TECHNICAL FIELD OF THE INVENTION

The present invention relates to a device for telescopic fork legs, preferably on a motorcycle or bicycle, where the telescopic fork leg comprises outer and inner legs and a damping system with a piston and piston rod arrangement that is arranged within these.

TECHNICAL BACKGROUND

A front fork for a motorcycle or a bicycle may be subjected to wheel speeds in the whole range of 0-10 m/s and stroke lengths of up to 300 mm. In order to be able to absorb such high speeds and such large strokes, great demands are made of the front fork. It must be able to absorb forces and be strong, while at the same time it must be able to handle a large flow of oil. It is also desirable to have good control in the whole range of speeds and for the damping to be adjustable. A compact and light system that may be adapted to fit several different front fork dimensions is also required. Reference is made, for example, to patent U.S. Pat. No. 6,260,832, that shows a front fork of the type described above. U.S. Pat. No. 6,260,832 does not, however, have the desirable build-up of pressure that is described below.

A common type of damping systems may be represented by a damper of the De Carbon type, see for example FR1055443A, and have a serial damping force construction that is based on a principle of pressurizing two locations in series in order to avoid cavitation or the admixture of air into the damping medium. This system has limitations in that the pressures in the two pressurizing locations must more or less harmonize with each other, as the drop in pressure ([Delta]P1=Piow-Pmid, [Delta]P2=Pmidt-Pgas) across the two pressurizing pistons should be greater than zero in order not to create cavitation. As the drop in pressure across the piston is dependent upon the flow resistance through the piston in combination with the force that acts on the piston, the flow resistance, controlled for example by a shims stack, may only be adjusted within a certain limited range which thus also results in a limited area of use for the damper. It is then also necessary to dimension pistons, piston rod and damping tubes so that the force absorption agrees with the pressures that have been built up, in order to obtain the required damping. With serial damping, the oil is forced through both the valves in series, which results in high flow speeds. With high flow speeds and high piston speeds, the design of the pistons is limited in order not to obtain an unwanted uncontrollable build-up of pressure due solely to the flow resistance.

A system with parallel damping solves the abovementioned problem. Examples of such dampers can be found in the patent documents EP1505315A2 and EP0322608A2. The parallelism in the damping arises through the damping medium being pressurized by two pressurizing pistons that are arranged parallel to each other in the damping chamber and in a space arranged outside the damping chamber. The pressurized outer space is interconnected with both the compression chamber and the return chamber. With parallel damping, the pressure on the low-pressure side of the damping piston is always as large as possible, irrespective of whether the front fork is subjected to a compression or a return stroke. The definition of the low-pressure side of the damping piston is the side of the piston where the volume of the chamber increases. Due to the fact that the pressure is never allowed to become zero on that side, cavitation is prevented. This parallel arrangement also means that the damper can be pressurized and the pressure, that is the damping, may be adjusted, without having to take into account the drop in pressure across the piston(s). The increase in pressure, as well as the increase in force, now takes place without cavitation, irrespective of the setting.

The designs according to EP1505315A2 and EP0322608A2 are adapted for shock absorbers that are not subjected to the same forces and impacts as a front fork.

EP1937995B1, filed by the applicant, solves this problem and discloses a device that comprises adjustable parallel damping, adapted to the demands of a front fork. The damping system disclosed comprises two concentric tubes in the form of a damping tube and an outer tube that is arranged around the damping tube that together form a removable insert system in the front fork. The insert system creates a double tube function in which the damping medium can flow in parallel as a result of the duct between the damping tube and the outer tube being used to connect together the two chambers and the common pressurizing location. This insert system forms a compact unit that is simple to adapt to different front fork dimensions and that can also be used as a kit for providing an existing front fork with parallel damping.

However, in recent years, advanced damping systems have come to be employed to a large extent also in the field of bicycles, more specifically the field of terrain bicycles, or mountain bikes. These applications place high demands on aspects of damping systems previously not quite as important, such as versatility, possibilities for aftermarket mounting, and most important place very high demands on reducing the weight of all components as much as possible. A device is thus required for a front fork of a bicycle that comprises adjustable parallel damping while at the same time minimizing the weight added to the bicycle. It is also advantageous if the device is able to be adjusted to suit different front fork dimensions and is adapted to be used as a kit for modifying an existing front fork.

SUMMARY OF THE INVENTION

The above-mentioned requirements are achieved by the present invention according to the independent claims. Preferred embodiments are set forth in the dependent claims.

Independent claim 1 of the invention relates to a removable insert system for a telescopic fork leg. The telescopic fork leg comprises outer and inner legs. The removable insert system comprises a piston and piston rod arrangement arranged at least partly within a first tube. The removable insert system is removably arranged within at least one of the inner legs such that, when being mounted in the inner leg, the removable insert system is adapted to form a damping system with the inner leg, and wherein the inner leg and said first tube are both acted upon by a flow of medium created by compression and expansion movements of the fork legs. The damping system further comprises medium flow passages that are parallel in relation to each other, and that run between the upper and lower sides of the piston, the flow being partially directed straight through the piston and partially through a space between the first tube and the inner leg.

Components of the removable insert system are acted upon by the flow of medium created by the compression and expansion movements of the fork legs. The removable insert system components and the inner leg together form a compact unit that comprises parallel medium flow passages for the flow between the upper and lower sides of the main piston, the flow straight through the piston and the flow that is directed in the space between the first tube and the inner leg. The medium flow passages are arranged parallel to each other in order to ensure low flow speeds between the sides of the main piston and thereby prevent the uncontrollable build-up in pressure and force on the sides of the piston as a result of the rapid movements and large strokes of the front fork.

The invention is based on the insight that by using the inner leg of the front fork as a part for the damping system, the weight of the insert system is greatly reduced, and since the inner leg of the front fork at hand is used the adaption of the system to different front fork dimensions is greatly facilitated. The system may therefore advantageously be used as a kit for providing an existing front fork with parallel damping. This insert system further forms a compact unit that is simple to adapt to different front fork dimensions and that can also be used as a kit for providing an existing front fork with parallel damping. Additional further developments will be apparent from the following claims.

With regards to the functionality of all aspects and embodiments of the invention disclosed in the application, with special regards to the parallel flow passages and the dual tube design, the following general principles applies. The removable insert system as well as the damping cartridge kit of the invention relate to the idea of allowing flow through different flow channels or passages, the flow areas of which are adjusted by means of valves. The valves may be comprised by combinations of high speed valves, low speed valves and check valves. These types of valve are generally well known in the art and will not be described in further detail.

The medium flow passages are arranged in such a way that they are parallel in relation to each other. As the passages are parallel, the flow is divided up between the two medium-flow passage areas and the flow speeds in the system can essentially be reduced, for example halved, in relation to the actual speed of the longitudinal displacement movements. The flow speed in the medium is determined by the frequency of the movements or the size of the impacts and, with a lower flow speed, the uncontrollable build-up of pressure and forces that can otherwise arise in the system is prevented.

The high-pressure and low-pressure sides of the damper change with the direction of the stroke. As a result of the flow paths and the position of the valves, the pressure on the low-pressure side is always as high as possible and cavitation is avoided. During a compression stroke the damping medium flows through the damping system through the medium flow passages. At high speeds, when parts of the damping medium on the high-pressure side are pressurized by a piston, for example a shimmed piston, the remaining quantity of medium flows via a passage through the adjustable valves and non-return valves, through the space between the first tube and the inner leg to the other side, that is the low-pressure side, of the piston. At low speeds, that for example do not cause sufficient pressure to open such a shim stack and/or a high-speed valve, the medium may flow via adjustable low-pressure valves via the same non-return valve to the low-pressure side.

During a return stroke, the damping medium may flow according to the same principle but in the opposite direction to the compression direction described above. The flow may thus be partially directed straight through the piston from the high-pressure side, and partially up through the space between the first tube and the inner leg 1a through the valves dependent upon high or low speed, and then on to the low-pressure side of the piston.

In some embodiments, the removable insert system may comprise a check valve arranged at the lower end of the first tube, such that a flow through the space between the first tube and the inner leg is prevented, i.e. not allowed, during a return stroke.

In embodiment where the compression and return adjustments are separated, the valves can be adjusted independently of each other. The pressure can therefore be controlled in such a way that the build-up is greatest during the return or compression stroke, depending upon the external circumstances. The damping characteristics can thus be maximally adapted to suit the terrain, as a result of the large range of adjustment that the valves now have. The large range of adjustment of the valves means an adjustment of the medium flow area from anywhere between maximal and minimal area depending upon the damping force requirements.

By means of the parallel passages described above, the flow speed to a specific valve can also be reduced if the pressure on this valve becomes critically high. As the damping medium will take the easiest path (the lowest pressure) in the system, this adjustment capability means that a wide range of pistons and pressurizing devices can now be utilized. An advantage of this is that larger pistons can be used and, with larger pistons, the pressure does not need to be so high in the system and the damper has a smoother characteristic. By a smoother characteristic is meant that the increase in pressure, and also the increase in force, can take place without cavitation, irrespective of the setting.

According to a first aspect of the present invention a removable insert system for a telescopic fork leg of a bicycle is provided. The telescopic fork leg comprises outer and inner legs. The removable insert system comprises a piston and piston rod arrangement arranged at least partly within a first tube. The removable insert system is removably arranged within one of the inner legs such that, when being mounted in the inner leg, the removable insert system is adapted to form a damping system with the inner leg, wherein the inner leg and the first tube are both acted upon by a flow of medium created by compression and expansion movements of the fork legs. The damping system further comprises medium flow passages that are parallel in relation to each other, and that run between the upper and lower sides of the piston.

According to one embodiment, the flow is partially directed through a medium passage straight through the piston and partially through a medium passage in a space between said first tube and said inner leg. I.e., one medium passage, which may be referred to as a first medium passage, is a medium passage straight through the piston and one medium passage, which may be referred to as a second medium passage, is a medium passage through a space formed between the first tube and the inner leg. The first and second medium flow passages may be parallell to one another.

According to one embodiment of the first aspect of the present invention a removable insert system for a telescopic fork leg of a bicycle is provided. The telescopic fork leg comprises outer and inner legs. The removable insert system comprises a piston and piston rod arrangement arranged at least partly within a first tube. The removable insert system is removably arranged within one of the inner legs such that, when being mounted in the inner leg, the removable insert system is adapted to form a damping system with the inner leg, wherein the inner leg and the first tube are both acted upon by a flow of medium created by compression and expansion movements of the fork legs. The damping system further comprises medium flow passages that are parallel in relation to each other, and that run between the upper and lower sides of the piston, the flow being partially directed straight through the piston and partially through a space between the first tube and the inner leg.

According to one embodiment, the medium flow passages are adjusted or selected by means of setting devices adapted to adapt the damping characteristics. Thus, the flow through one or both of the respective medium flow passages can be arranged so that it can be adjusted or selected by means of the setting devices in order to achieve, for example, matching of the damping characteristics to different types of terrain, by means of a wide range of settings. Exemplary setting devices may include for example valves or similar devices. The first and second setting devices may be the same type of setting device, or different types of setting devices adapted to the characteristics of the first and second fluid flow and/or adapted to perform different functionalities of the damper depending on the application. Thus, the removable insert system may be easily adapted to suite different riders and/or conditions According to one embodiment, the first tube is adapted to be arranged concentric with said inner leg.

According to one embodiment, the setting devices comprise a first and a second adjustable device. The first adjustable device is affecting a flow in the medium flow passages during compression movements and the second adjustable device is affecting a flow in the medium flow passages during return movements, such that the first adjustable device and the second adjustable device can be separately adjusted to adjust compression and return characteristics independent of each other. The first and second adjustable devices may be the same type of adjustable device, or different types of adjustable devices adapted to the characteristics of the flow during compression and return movements. Thus, an even more precise adaption and wider range of setting may be achieved, such that the damping may be precisely adapted to rider and riding conditions.

According to one embodiment, the first adjustable device comprises first adjustable means for affecting the flow during compression movements at a low piston speed and second adjustable means for adjusting the flow during compression movements at high piston speed. The first and said second adjustable means can be separately adjusted. The first and second adjustable means may be the same type of adjustable means, or different types of adjustable means adapted to the characteristics of the flow during low piston speeds and high piston speeds and/or adapted to perform different functionalities of the damper depending on the piston speed. Thus, an even more precise adaption and wider range of settings may be achieved, such that the damping may be precisely adapted to rider and riding conditions.

According to one embodiment, the medium flow passages are connected to a pressurizing location that is common to both medium flows and the pressurizing location is pressurized by a pressurizing device. A wide range of settings is achieved by the medium flow passages comprising separate connections to a common pressure build-up location where the pressure is created by the abovementioned pressurizing device. In some embodiments, the removable insert system may create a double tube function in which the damping medium can flow in parallel as a result of the duct between the damping tube and the outer tube being used to connect together the two chambers and the common pressurizing location. The pressurizing location may in some embodiments be connected to the medium flow passages between the damping cylinder and the outer tube via a head that also comprises valves for adjusting the flow of the medium.

In one embodiment, the pressurizing device comprises a piston that is pressurized by a pressurizing component selected from a group consisting of a volume of fluid, a spring, an elastic member and an expandable hollow member.

In one embodiment, the pressurizing device is arranged in a separate external container.

In one embodiment, the piston rod extends from at least a first end of said first tube, and the removable insert system further comprises sealing means adapted to seal the piston rod to the inner leg, the sealing means being arranged where said piston rod extends from said first tube. The sealing means may be adapted to at least partially seal the volume inside the first tube from the space between the first tube and the inner leg. Exemplary sealing means may comprise elastomeric or rubber seals, o-rings or the like.

In one embodiment the sealing means further comprise a check valve such that a flow of fluid is allowed through the check valve during the compression stroke and blocked during return stroke.

In one embodiment, the removable insert system further comprises first retaining means adapted to retain said removable insert system in said inner leg. Such retaining means may include for example threads, a clamp, a press fit or similar. Further, the first retaining means may be arranged at an end of the inner leg. In some embodiments, such retaining means may be combined with the adjustable devices for adjusting the setting devices of the removable insert system externally of said inner leg.

In one embodiment the removable insert system further comprises second retaining means adapted to retain said removable insert system in said outer leg. Such retaining means may be designed to couple the movement of the outer tube to a movement to a component of the removable insert system, and hence to the damping system.

In one embodiment, the second retaining means is arranged at an end of said piston rod and adapted to attach said end of said piston rod to said outer leg. Exemplary retaining means may include for example a nut. For such a design, the movement of the outer leg is coupled to the movement of the piston rod, and hence piston, of the damping system.

In one embodiment, the second adjustable device is arranged at said second retaining means. Such a second adjustable device may in one embodiment be adapted to adjust the damping properties for the return stroke.

According to another aspect, the present invention relates to a damping cartridge kit for upgrading a telescopic fork leg of a bicycle. Said cartridge kit comprising a removable insert system according to what has been described in the previous sections, and said system comprising an inner leg of a telescopic fork leg, the inner leg and the removable insert system forming said damping system. The cartridge kit is adapted to be detachably mounted in an outer leg of said telescopic fork leg. This aspect of the invention provides for the upgrading of an existing telescopic fork leg in a convenient manner. By making an inner leg of a fork leg part of the damping cartridge kit, as well as for forming the damping system, the upgrading is facilitated since less modification or adaption of the kit as such must is required. In addition, a weight reduction is achieved since the existing inner leg of the fork is replaced as well.

According to one embodiment, the piston rod extends from the at least first end of the inner leg, and the damping cartridge kit further comprises sealing means arranged to seal the piston rod to said inner leg. The sealing means are arranged where said piston rod extends from said inner leg. The sealing means may thereby be adapted to at least partially seal the volume inside the first tube from the space between the first tube and the inner leg. Exemplary sealing means may comprise elastomeric or rubber seals, o-rings or the like.

According to one embodiment, the damping cartridge kit comprises second retaining means, and the second retaining means is adapted to retain said cartridge kit in said outer leg. Such retaining means may be designed to offer a versatile, reliable and easy-to-use attachment in order to facilitate upgrading for the user and ensure that the kit may be used with any available telescopic fork legs. Exemplary retaining means may include threading, a press fit, a nut, a screw joint connection or similar.

According to one embodiment, the cartridge kit further comprises a head arranged at a second end of said inner leg, wherein at least one of said setting devices is arranged in said head. Setting devices may include a knob or a lever. Hereby, the adjusting of for example valve is convenient for the user, both during mounting of the kit onto the fork and during riding.

Further objectives of, features of and advantages with the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention is described in the following illustrative and non-limiting detailed description of exemplary embodiments, with reference to the appended drawings, wherein:

FIG. 1b shows a cross sectional view of the first and second fork leg of FIG. 1a.

All figures are schematic, not necessarily to scale, and generally only show parts which are necessary in order to elucidate the invention, wherein other parts may be omitted or merely suggested. Throughout the figures the same reference signs designate the same, or essentially the same features.

DETAILED DESCRIPTION OF EMBODIMENTS

Throughout the application, the wording "lower" refers to a location positioned, in the mounted state, closest to the wheel and the wording "upper" refers to location positioned, when mounted, farthest from the wheel.

Figure 1A:
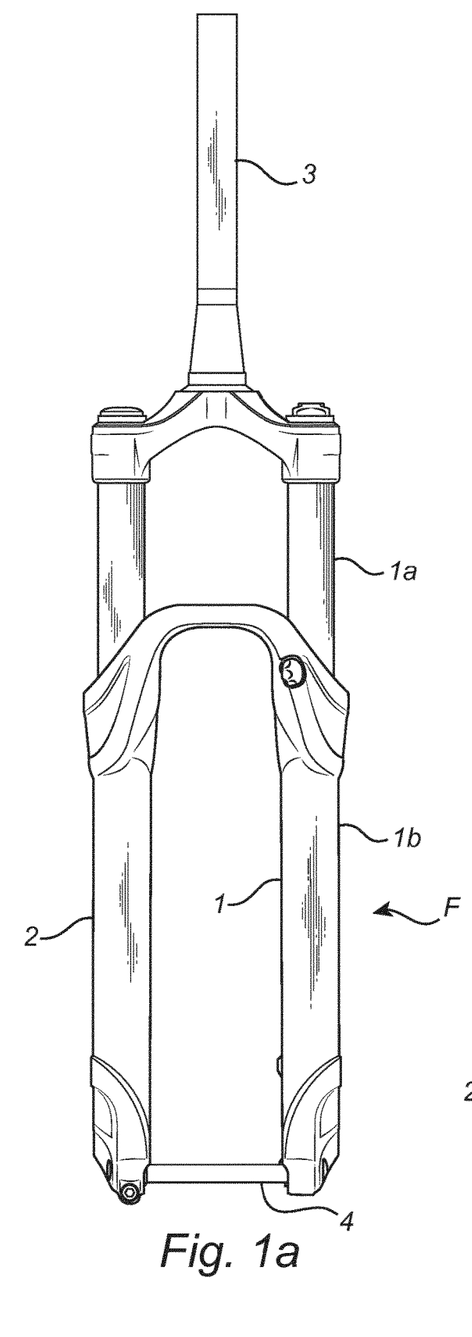
FIG. 1a shows a first and a second telescopic fork leg mounted in a front fork of a bicycle according to one aspect of the invention.
Figure 1B:
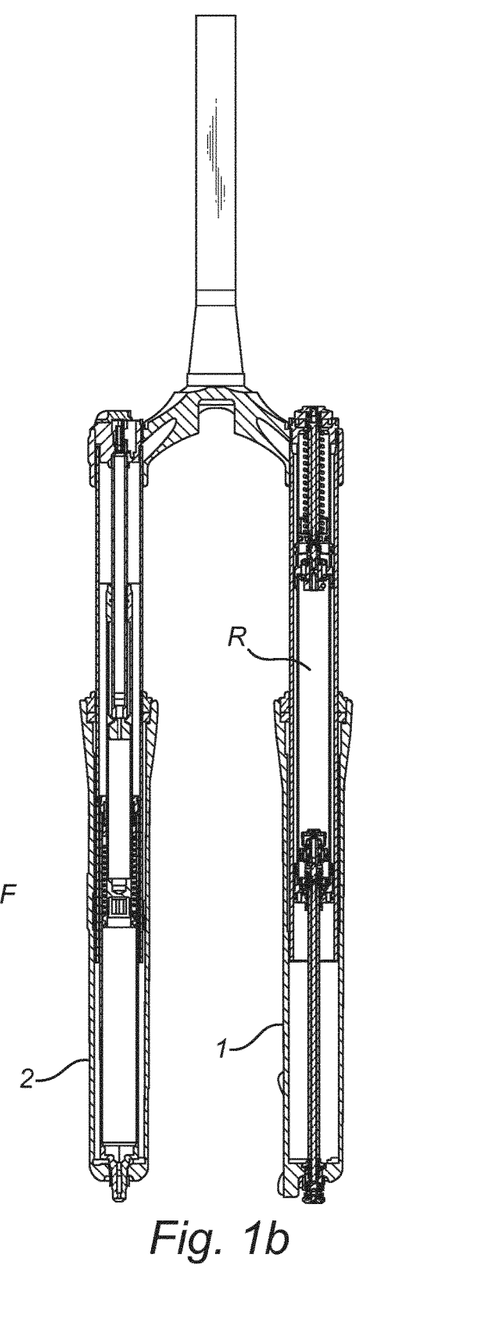

FIG. 1a shows a first and a second telescopic fork leg 1, 2 mounted in a front fork F of a vehicle, in this embodiment a bicycle, or mountain bike. The fork legs 1, 2 are arranged on each side of a steering pillar 3. The lower parts of the fork legs 1,2 are attached to the wheel axle 4 and the upper ends are connected to the frame of the vehicle via steering pillar 3. Each telescopic fork leg 1, 2 comprise an inner 1a, 2a and an outer 1b, 2b leg. The removable insert system R is in the exemplary embodiment in FIGS. 1a-b removably arranged in the first telescopic fork leg 1. A spring system is arranged in the second telescopic fork leg 2; spring systems are known in the art and will not be described in further detail. FIG. 1b shows a cross section of the front fork F, exposing the removable insert system R of the invention arranged within the inner leg 1a of the first telescopic fork leg 1.

Figure 2:
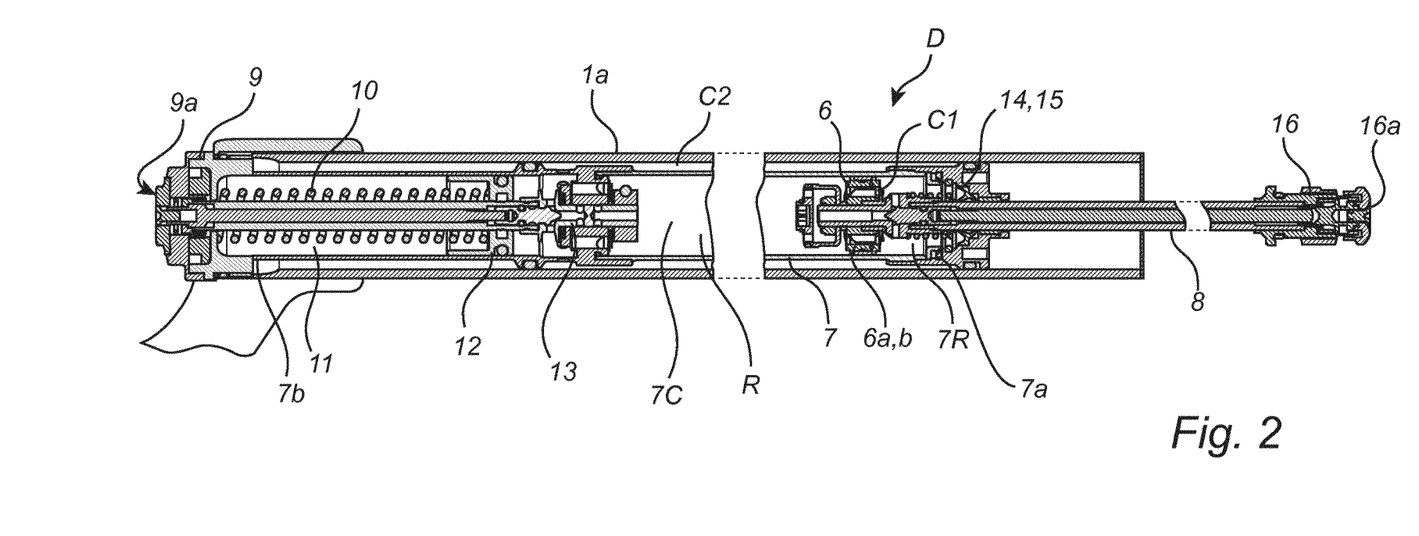
FIG. 2 shows a removable insert system according to one embodiment of the invention

FIG. 2 shows the removable insert system R removably arranged within the inner tube 1a of the first telescopic fork leg 1, its construction and function will now be described in greater detail. The removable insert system R comprises a piston 6 arranged within a first tube, or cylinder, 7 and a piston rod 8 arranged partly within the first tube 7 and extending through a first end 7a of the first tube 7.

The removable insert system, R is removably arranged within the inner leg 1a, such that the removable insert system R and the inner leg 1a form a damping system D. The damping system D is thereby designed to utilize the first tube 7 and the inner leg 1a in order to create a double tube function that contributes to the parallel flow. The piston 6, which in the illustrated case is a shimmed damping piston, divides the first tube 7, which may also be described as a damping chamber 7, into a return chamber 7R and a compression chamber 7C. The return chamber and the compression chamber alternate in being the high-pressure and low-pressure side.

The parallel flow channels C1, C2 are the flow passages C1 through the piston 6 as well as the flow passage C2 in the space between the first tube 7 and the inner leg 1a.

The illustrated embodiment of the damping system further comprises setting devices 9a, 16a by which the medium flow passages may be adapted in order to adapt the damping characteristics. The setting devices of the illustrated embodiment comprise first and second adjustable devices 13, 6a-c adapted to adjust compression- and return characteristics independent of each other. The setting devices 9a adjusting the characteristics of the compression damping are arranged in a top cap 9; the top cap is arranged at a second end 7b of the inner leg and the setting devices 9a, in this case a knob 9a, is adapted to protrude to be accessible to the rider. Hereby the rider may easily adjust the characteristics of the damper, preferably also during riding.

The damping system of FIG. 2 further comprises a spring 10 adapted to pressurize the system by acting on separating piston 12, the spring 10 is arranged in an air filled chamber 11 adjacent to the top cap. Other embodiment may however include other means for pressurization such as an external reservoir or the like.

The separating piston 12 is arranged to separate the gas filled chamber 11 from the oil in the compression chamber 7C of the inner tube, or cylinder, 7. An adjustable device, in the illustrated case a compression valve 13, is arranged. The compression valve 13 is adapted to provide adjustable damping utilizing an adjustable clamp 13a and further comprises a shim stack 13c on both sides, further an adjustable needle valve 13b is provided. The adjustable device 13 is thereby adapted to provide low- and high speed adjustment, such that the damping may be adapted to an even higher degree. The low- and high speed adjustment may be performed jointly or independently.

The damping piston 6 also comprises an adjustable device 6a, 6b for adjusting the return flow and a bleed channel. In order to adjust the return flow, an adjustable needle valve 6c is arranged in the piston 6. Further, a check valve 6b adapted to close the bleed channel during the compression stroke is arranged. In other words, a bleed flow though the piston 6 is only allowed during the return stroke.

Further, sealing means 14 are arranged at the first end 7a of the first tube 7. The sealing means are adapted to seal the piston rod 8 to the inner leg and further comprises a check valve 15 adapted to allow a flow of fluid through the check valve 15 during the compression stroke and block the fluid during return stroke.

A retaining means 16 in the form of a nut 16 is arranged at the end of the piston rod 8. The nut 16 is adapted to secure the piston rod, and hence the removable insert system R, to the outer tube 1b. Further, a setting device 16a for adjusting the needle valve 6c, and thus the return flow, is arranged at the retaining means.

Figure 3A:
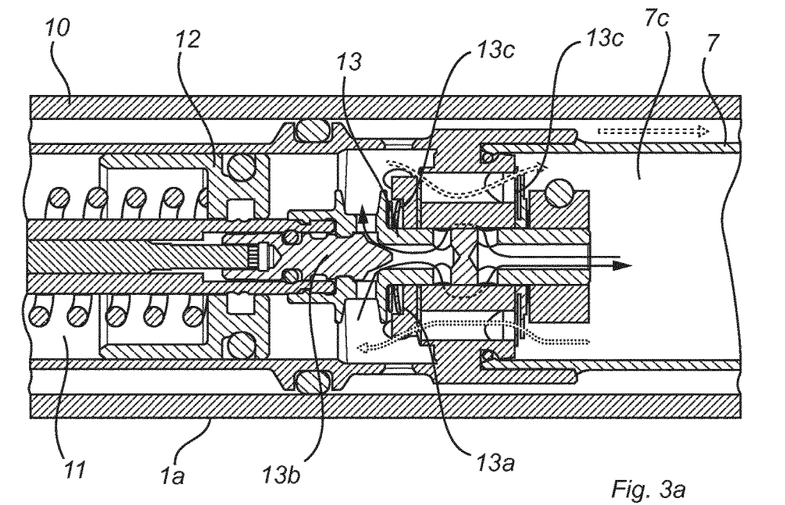
FIG. 3a shows a detailed cross sectional view of the upper part of the damping system according to one embodiment of the invention

FIG. 3a shows a detailed cross sectional view of the upper part of the damping system D comprising the pressurizing spring 10, the separating piston 12 and the compression valve 13. The compression valve comprises a variable clamp 13a, adapted to provide variable high speed adjustment for the compression stroke and an adjustable needle valve 13b providing low speed compression adjustment. The compression valve further comprises stacked shims 13c arranged on each side of the valve, providing resistance for the flow through the compression valve.

The flow during the compression stroke is illustrated by the dashed arrows showing a first flow through the valve 13 and a second flow in the space between the first tube 7 and the inner leg 1a. The flow during return stroke is illustrated by the dotted arrows. The corresponding thinner arrows indicate the bleed flow through the valve during compression and return.

Figure 3B:
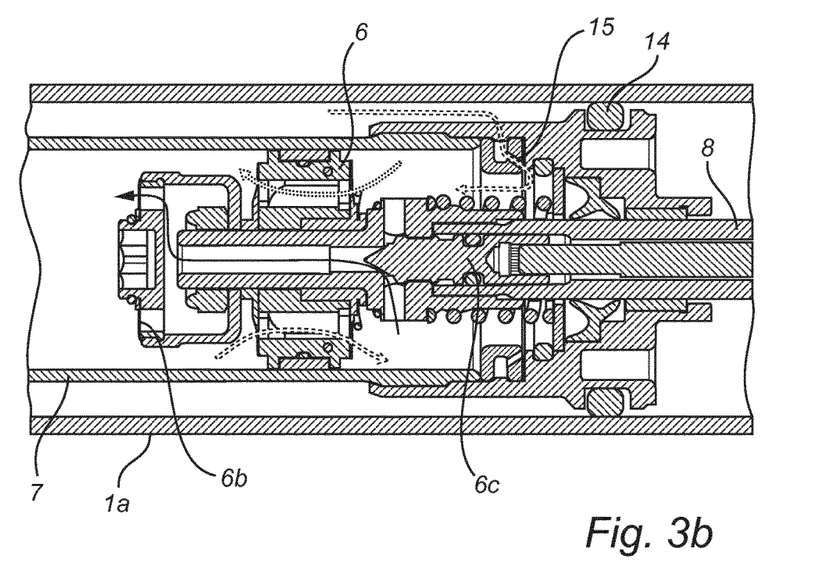
FIG. 3b shows a detailed cross sectional view of the lower part of the damping system according to one embodiment of the invention

FIG. 3b shows a detailed cross section view of lower part of the damping system comprising the shimmed piston 6 arranged on the piston rod 8. The damping piston 6 comprises a bleed channel and a check valve 6b adapted to close the bleed channel during the compression stroke. In other words, a bleed flow though the piston 6 is only allowed during the return stroke. In order to adjust the return flow, an adjustable needle valve 6c is arranged in the piston 6. Further, the sealing means 14 are shown in greater detail, as well as the check valve 15 arranged at the sealing means, allowing a flow through the check valve during the compression stroke and blocking the fluid flow during return flow.

The flow during the compression stroke is illustrated by the dashed arrows showing a first flow through the piston 6 and a second flow in the space between the first tube 7 and the inner leg 1a. The dotted arrows indicate the flow during return movement. The thinner corresponding arrows indicate the corresponding bleed flows through the valve during compression and return.

Figure 4:
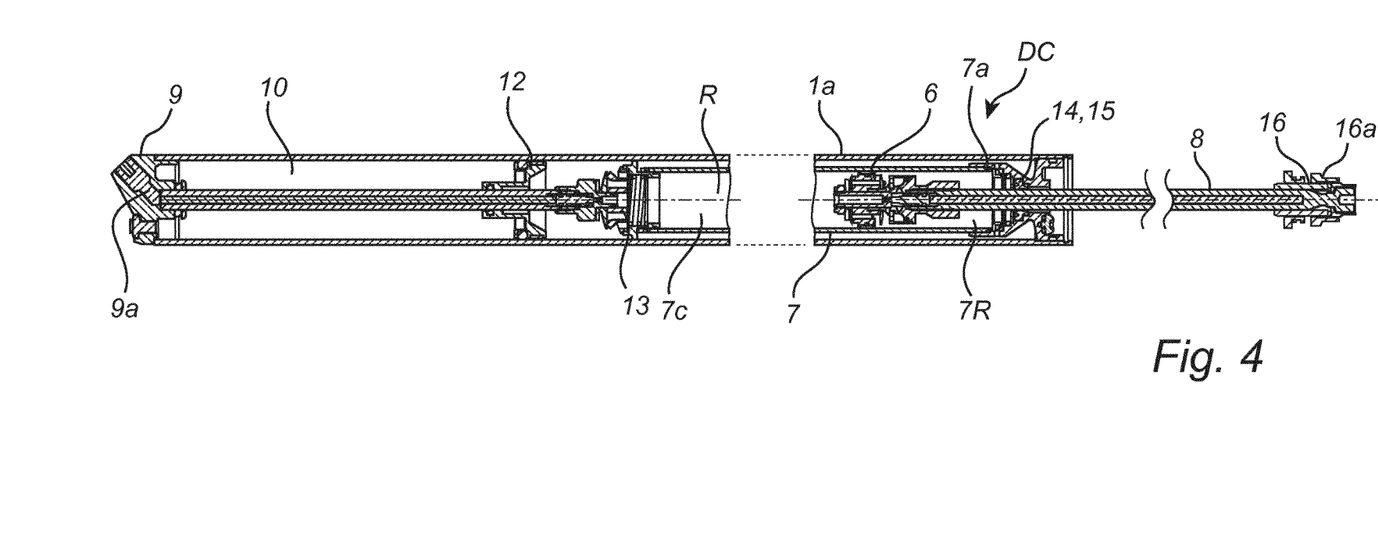
FIG. 4 shows a cross sectional view of a damping cartridge kit according to one aspect of the invention.

FIG. 4 shows a damping cartridge set DC according to one embodiment of the invention. The damping cartridge kit DC comprises an inner leg 1a and a removable insert system R according to what has been described above in the previous sections together forming a damping system. Thus, the damping cartridge kit is adapted to be detachably mounted in an outer leg of a telescopic fork leg, such that a user wishing to upgrade an existing front fork may replace the inner leg of the existing fork leg with the damping cartridge kit. The damping cartridge kit DC as shown in FIG. 4 may be provided in the completely mounted state as shown in FIG. 4, including being filled with oil, such that the replacement of the inner leg is as convenient as possible for the user.

The damping cartridge kit comprises an inner leg 1a and a removable insert system R, together forming a damping system D. The removable insert system comprises a piston 6 arranged within a first tube, or cylinder, 7 and a piston rod 8 arranged partly within the first tube 7 and extending through a first end 7a of the first tube 7.

By the arrangement of the removable insert system within the inner leg 1a, the damping cartridge kit DC comprises a damping system D formed by the insert system R and the inner leg 1a. The damping system D is thereby designed to utilize the previously described double tube function that contributes to the parallel flow. The piston 6, which may be designed for example as a shimmed damping piston, divides the first tube 7, which may also be described as the damping chamber 7, into a return chamber 7R and a compression chamber 7C. The return chamber and the compression chamber alternate in being the high-pressure and low-pressure side.

The illustrated embodiment of the damping system further comprises setting devices 9a by which the medium flow passages may be adapted in order to adapt the damping characteristics. The setting devices of the illustrated embodiment comprise first and second adjustable devices 9a, 16a adapted to adjust compression- and return characteristics independent of each other. The setting devices adjusting the characteristics of the compression damping are arranged in a top cap 9, or head 9. The top cap, or head 9, is arranged at an upper end of the inner leg 1a to be accessible to the rider. Hereby the rider may easily adjust the characteristics of the damper, preferably also during riding.

The top cap 9 further comprises means for filling a top gas chamber 10 with gas. The top gas chamber 10 is arranged adjacently to the top cap 9 and adapted to be filled with gas and thereby pressurize the system.

A separating piston 12 is arranged to separate the gas filled top chamber 10 from the oil in the compression chamber 7C of the inner tube, or cylinder, 7. An adjustable device, in the illustrated case a compression valve 13, is arranged. The compression valve 13 is adapted to provide adjustable damping utilizing an adjustable needle valve and further comprises a shim stack. The adjustable device is thereby adapted to adjust the compression damping, such that the damping may be adapted to the riding conditions at high degree. The low- and high speed adjustment may be performed jointly or independently.

A check valve for compensating for the oil displacement of oil due to the movement of the piston rod and thereby avoid cavitation is arranged at the upper end of the cylinder 7.

Further, the system comprises a shimmed damping piston 6, comprising a bleed channel arranged in the piston 6. A check valve is adapted to close the bleed channel during the compression stroke is arranged. Thus, a bleed flow though the piston 6 is only allowed during the return stroke. In order to adjust the return flow in the illustrated embodiment, the damping piston 6 comprises an adjustable device comprises an adjustable needle valve.

Sealing means 14 are arranged at the first end 7a of the first tube 7. The sealing means are adapted to seal the piston rod 8 to the inner leg and further comprises a check valve 15 adapted to allow a flow of fluid through the check valve 15 during the compression stroke and block the fluid during return strokes.

Retaining means 16 in the form of a nut 16 is arranged at the end of the piston rod 8. The nut 16 is adapted to retain, or secure, the damping cartridge kit to the outer tube. Further, a setting device 16a for adjusting the return flow adjusting device is arranged at the retaining means.

Figure 5A:
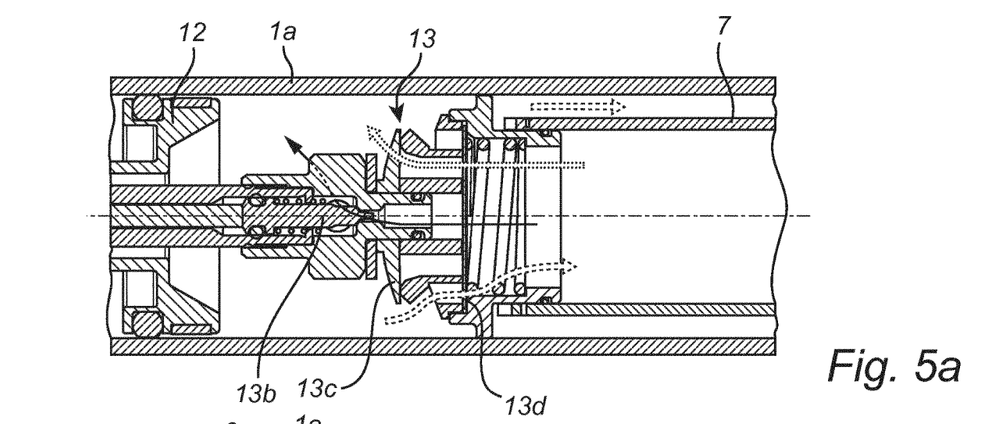
FIG. 5a shows a detailed cross sectional view of the upper part of the damping cartridge kit, and hence damping system, of the cartridge kit shown in FIG. 4.

FIG. 5a shows a detailed cross sectional view of the upper part of the damping cartridge kit, and hence the damping system, comprising the separating piston 12 and the compression valve 13. The compression valve comprises an adjustable needle valve 13b providing adjustable damping for the compression stroke. The compression valve further comprises stacked shims 13c, providing resistance for the flow through the compression valve. A check valve 13d is provided; the check valve allows a flow during the compression stroke The flow during the compression stroke is illustrated by the dashed arrows showing a first flow through the valve 13 and a second flow in the space between the first tube 7 and the inner leg 1a. The flow during return stroke is illustrated by the dotted arrows. The thinner arrows indicate the corresponding bleed flows through the valve during compression and return.

Figure 5B:
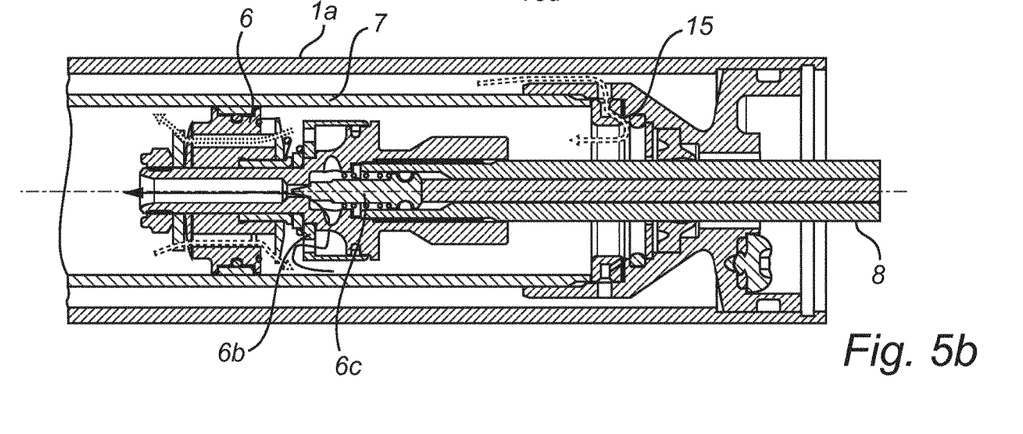
FIG. 5b shows a detailed cross sectional view of the lower part of the damping cartridge kit, and hence damping system, of the cartridge kit shown in FIG. 4.

FIG. 5b shows a detailed cross section view of lower part of the damping cartridge kit, and hence the damping system, comprising the piston 6 arranged on the piston rod 8. The damping piston 6 comprises a bleed channel and a check valve 6b adapted to close the bleed channel during the compression stroke. In other words, a bleed flow though the piston 6 is only allowed during the return stroke. In order to adjust the return flow, an adjustable needle valve 6c is arranged in the piston 6. Further, the sealing means 14 are shown in greater detail, as well as the check valve 15 arranged at the sealing means, the check valve 15 allowing a flow through the check valve during the compression stroke and blocking the fluid flow during return flow.

The flow during the compression stroke is illustrated by the dashed arrows showing a first flow through the valve 6a-c and a second flow in the space between the first tube and the inner leg 1 a. The dotted arrows indicate the flow during return movement. The thinner arrows indicate the corresponding bleed flows through the valve during compression and return.

While specific embodiments have been described, the skilled person will understand that various modifications and alterations are conceivable within the scope as defined in the appended claims.

The invention claimed is:

1. A removable insert system(R) for a telescopic fork leg (1) of a bicycle, said telescopic fork leg (1) comprising outer and inner legs (1 b,a),
   wherein said removable insert system comprises a piston and piston rod arrangement (6, 8) comprising a piston rod (8) arranged at least partly within a first tube (7),
   said removable insert system (R) being removably arranged within one of said inner legs (1a) such that, when being mounted in said inner leg, the removable insert system is adapted to form a damping system (D) with said inner leg, and wherein said inner leg and said first tube are both acted upon by a flow of medium created by compression and expansion movements of the fork legs, and
   said damping system further comprising first medium flow passage (C1) and second medium flow passage (C2) that are parallel in relation to each other, and that run between the upper and lower sides of said piston (6);
   wherein said flow is partially directed through the first medium flow passage through the piston (6) and partially through the second medium flow passage in a space between said first tube and said inner leg.

2. A removable insert system according to claim 1, wherein the first medium flow passage and the second medium flow passage are adjusted or selected by setting devices adapted to adapt the damping characteristics.

3. A removable insert system according to claim 1, wherein said first tube is adapted to be arranged concentric with said inner leg.

4. A removable insert system according to claim 2, wherein said setting devices comprise a first and second adjustable device, the first adjustable device affecting a flow in the first medium flow passage and the second medium flow passage during compression movements and the second adjustable device affecting a flow in the first medium flow passage and the second medium flow passage during return movements, such that the first adjustable device and the second adjustable device can be separately adjusted to adjust compression and return characteristics independent of each other.

5. A removable insert system according to claim 4, wherein said first adjustable device comprises first adjustable means for affecting the flow during compression movements at a low piston speed and second adjustable means for adjusting the flow during compression movements at high piston speed, and wherein said first and said second adjustable means can be separately adjusted.

6. A removable insert system according to claim 1, wherein the first medium flow passage and the second medium flow passage are connected to a pressurizing location that is common to both the first medium flow passage and the second medium flow passage and the pressurizing location being pressurized by a pressurizing device.

7. A removable insert system according to claim 6, wherein said pressurizing device comprises a piston that is pressurized by a pressurizing component selected from a group consisting of a volume of fluid, a spring, an elastic member and an expandable hollow member.

8. A removable insert system according to claim 6, wherein said pressurizing device is arranged in a separate external container.

9. A removable insert system according to claim 1, wherein said piston rod extends from at least a first end of said first tube, and wherein said removable insert system further comprises sealing means adapted to seal said piston rod to said inner leg, said sealing means being arranged where said piston rod extends from said first tube.

10. A removable insert system, according to claim 9, wherein said sealing means further comprise a check valve such that a flow of fluid is allowed through the check valve during compression stroke and blocked during return stroke.

11. A removable insert system according claim 1, further comprising first retaining means adapted to retain sad removable insert system in said inner leg.

12. A removable insert system according to claim 1, further comprising second retaining means adapted to retain said removable insert system in said outer leg.

13. A removable insert system according to claim 12 wherein said second retaining means is arranged at an end of said piston rod and adapted to attach said, end of said piston rod to said outer leg.

14. A removable insert system according to claim 4, further comprising second retaining means adapted to retain said removable insert system in said outer leg, wherein said second adjustable device is arranged at said second retaining means.

15. A damping cartridge kit (DC) for upgrading a telescopic fork leg of a bicycle, said cartridge kit comprising a removable insert system (R) according to claim 1 and said cartridge kit further comprising an inner leg (1a) of a telescopic fork leg, said inner leg and said removable insert system forming a damping system (D), wherein said cartridge kit is adapted to be detachably mounted in an outer leg of said telescopic fork leg.

16. A damping cartridge kit according to claim 15, wherein said piston rod extends from at least a first end of said inner leg, and wherein said damping cartridge kit further comprises sealing means arranged to seal said piston rod to said inner leg, said sealing means being arranged where said piston rod extends from said inner leg.

17. Damping cartridge kit according to claim 15, further comprising second retaining means adapted to retain said removable insert system in said outer leg, wherein said second retaining means is adapted to retain said cartridge kit in said outer leg.

18. Damping cartridge kit according to claim 15, wherein said cartridge kit further comprises a head arranged at a second end of said inner leg, wherein at least one of said setting devices is arranged in said head.

19. A removable insert system (R) for a telescopic fork leg (1)of a bicycle, said telescopic fork leg (1) comprising outer and inner legs (1 b,a),
wherein said removable insert system comprises a piston and piston rod arrangement (6, 8) comprising a piston rod (8) arranged at least partly within a first tube (7),
wherein said removable insert system (R) being removably arrangable within one of said inner legs (1a),
wherein said piston divides said first tube 7 into two chambers (7C, 7R), and
wherein the removable insert system creates a double tube function in which a damping medium can flow in parallel in a duct between the first tube (7) and an outer tube, wherein said outer tube connects the two chambers and a common pressurizing location (10), said damping system further comprising first medium flow passage (C1) and second medium flow passage (C2) that are parallel in relation to each other, and that run between upper and lower sides of said piston (6).

* * * * *